United States Patent
Sunkara et al.

(10) Patent No.: US 7,268,182 B2
(45) Date of Patent: *Sep. 11, 2007

(54) POLYTRIMETHYLENE ETHER DIOL CONTAINING COATING COMPOSITIONS

(75) Inventors: Hari Babu Sunkara, Hockessin, DE (US); Patricia Mary Ellen Sormani, Newark, DE (US); James William O'Neil, Chadds Ford, PA (US); Joseph V. Kurian, Hockessin, DE (US)

(73) Assignee: E. I. du Pont de Nemours & Company, Wilmington, DE (US)

(*) Notice: Subject to any disclaimer, the term of this patent is extended or adjusted under 35 U.S.C. 154(b) by 219 days.

This patent is subject to a terminal disclaimer.

(21) Appl. No.: 10/804,260

(22) Filed: Mar. 19, 2004

(65) Prior Publication Data

US 2004/0249061 A1    Dec. 9, 2004

Related U.S. Application Data

(60) Provisional application No. 60/456,756, filed on Mar. 21, 2003.

(51) Int. Cl.
| C08J 3/00 | (2006.01) |
| C08K 3/20 | (2006.01) |
| C08L 75/00 | (2006.01) |
| B05D 1/36 | (2006.01) |
| B32B 5/16 | (2006.01) |

(52) U.S. Cl. .......... 524/589; 427/407.3; 427/385.5; 427/407.1; 427/409; 427/410; 427/372.2; 428/63; 428/411.1; 428/423.1; 428/425.8; 428/447; 428/461; 428/505; 523/406; 524/500; 524/507; 524/512; 524/539; 524/542; 524/588; 524/590; 524/591; 524/839; 524/840; 525/55; 525/100; 525/101; 525/107; 525/123; 525/131; 525/154; 525/411; 525/412; 525/413; 525/414; 525/460; 525/472; 525/474

(58) Field of Classification Search .......... 427/409, 427/410, 407.1, 407.3, 472.2, 385.5; 428/423.1, 428/63, 411.1, 425.8, 447, 457, 461, 500, 428/502, 505; 523/406; 524/500, 507, 512, 524/539, 542, 588, 589, 590, 591, 839, 840; 525/55, 100, 101, 107, 123, 131, 154, 411, 525/412, 413, 414, 460, 472, 474

See application file for complete search history.

(56) References Cited

U.S. PATENT DOCUMENTS

| 4,591,533 | A | 5/1986 | Antonelli et al. | |
| 5,010,140 | A | 4/1991 | Antonelli et al. | |
| 5,055,545 | A | 10/1991 | Lawson | |
| 5,596,043 | A | 1/1997 | Harris et al. | |
| 5,633,362 | A | 5/1997 | Nagarajan et al. | |
| 5,686,276 | A | 11/1997 | Laffend et al. | |
| 5,763,528 | A | 6/1998 | Barsotti et al. | |
| 5,821,092 | A | 10/1998 | Nagarajan et al. | |
| 6,210,758 | B1 | 4/2001 | McNeil et al. | |
| 6,221,494 | B1 | 4/2001 | Barsotti et al. | |
| 6,433,131 | B1 | 8/2002 | Zhou et al. | |
| 6,875,514 | B2 * | 4/2005 | Sormani et al. | 428/423.1 |
| 2002/0007043 | A1 | 1/2002 | Sunkara et al. | |
| 2002/0010374 | A1 | 1/2002 | Sunkara et al. | |

* cited by examiner

Primary Examiner—Patrick Niland
(74) Attorney, Agent, or Firm—Kevin S. Dobson

(57) ABSTRACT

A coating composition comprising a film forming binder of
  a. at least one polymer that has pendant groups, such as, hydroxyl, carboxyl, glycidyl, amine, amide, silane and mixtures thereof that are reactive with a crosslinking component and the polymer has a glass transition temperature (Tg) of 10 to 80° C.;
  b. a polytrimethylene ether diol having a Mn (number average molecular weight) of 500 to 5,000; and
  c. a crosslinking component, such as, organic polyisocyanates, melamine formaldehydes, alkylated melamine formaldehydes, benzoquanamine formaldehyde, urea formaldehyde, polyepoxides, silane resin and any mixtures thereof;

wherein the coating composition can be used as a clear coating composition and can contain pigments and may be used as a pigmented top coating, a pigmented base coating, a primer or primer surfacer coating and is useful for coating automobile and truck bodies and parts, industrial equipment, appliances and exterior structures.

47 Claims, No Drawings

POLYTRIMETHYLENE ETHER DIOL CONTAINING COATING COMPOSITIONS

CROSS-REFERENCE TO RELATED APPLICATION

This application claims priority under 35 U.S.C. §119 from U.S. Provisional Application Ser. No. 60/456,756 (filed Mar. 21, 2003), which is incorporated by reference herein as if fully set forth.

BACKGROUND OF THE INVENTION

1. Field of the Invention

This invention is directed to coating compositions, in particular, to coating composition useful as interior and exterior top coats, base coats, primers, primer surfacers and primer fillers having excellent physical properties, such as, flexibility, hardness, chip resistance and when used as a primer, a primer surfacer or a primer filler also has a combination of excellent sandability and chip resistance.

2. Description of the Prior Art

Finishes used in the manufacture, repair and refinish of automobile and truck bodies and parts, industrial equipment, appliances and the like must provide a high quality appearance and have excellent physical properties to withstand long term use, particularly when exposed to weathering. Many finishes now in use are multi-layered finishes and each layer has different requirements. For example, the multi-layer finishes on automobile and truck bodies and parts typically utilize the following: (1) an electrocoat layer applied over a substrate, typically, a phosphatized cold rolled steel, (2) a primer layer, (3) a colored layer, typically pigmented, and (4) a clear layer. A colored top coat layer may be used in place of the colored layer and clear layer. On repairing or refinishing such multi-layer finishes, a suitable primer, primer surfacer or primer filler coating is applied over the multi-layer finish that usually is sanded thereby exposing one or more layers or is applied over a filler material that has been used to fill in surface imperfections.

This primer, primer surfacer or primer filler, herein after, "primer", has many requirements. It must have adhesion to the substrate and provide a surface to which the colored layer or top coat will adhere. It must be readily sandable in a reasonably short period of time after application, for example, about three hours after application. It must provide the resulting multi-layer finish with good impact resistance, in particular, stone chip resistance.

Coatings used to form finishes on appliances, flexible and rigid thermoset or thermoplastic substrates, industrial equipment, exterior structures, and the like may be applied directly to the substrate which may be untreated, primed or surface treated. The resulting finish must have the required properties for its intended use.

It would be desirable to have a basic coating composition that can be formulated to meet the physical demands of these wide varieties of end uses. The novel composition of this invention can be readily formulated using conventional techniques to form finishes that have the required physical properties that meet typical end use requirements for the above applications. Also, it would be desirable that such a composition contains components that are derived from renewable resources. The novel composition of this invention meets these aforementioned requirements.

SUMMARY OF THE INVENTION

A coating composition comprising a film forming binder of a. at least one polymer that has pendant groups, such as, hydroxyl, carboxyl, glycidyl, amine, amide, silane and mixtures thereof that are reactive with a crosslinking component and the polymer has a glass transition temperature (Tg) of 10 to 80° C.;

b. a polytrimethylene ether diol having a Mn (number average molecular weight) of 500 to 5,000; and c. a crosslinking component, such as, organic polyisocyanates, melamine formaldehydes, alkylated melamine formaldehydes, benzoquanamine formaldehyde, urea formaldehyde, polyepoxides, silane resins and any mixtures thereof;

wherein the coating composition can be used as a clear coating composition, can contain pigments and be used as a pigmented top coating, a pigmented base coating, a primer, primer filler, or primer surfacer coating and is useful for coating, for example, automobile and truck bodies and parts, industrial equipment, appliances, and interior and exterior structures.

DETAILED DESCRIPTION OF THE INVENTION

The novel coating composition of this invention preferably is a solvent-borne coating composition containing a film forming binder of at least one polymer that has pendant groups, such as, hydroxyl, carboxyl glycidyl, amine, amide, silane or mixtures of these groups that are reactive with a crosslinking component utilized in the composition and the polymer has a glass transition temperature (Tg) of 10 to 80° C. The binder contains a polytrimethylene ether diol having a Mn (number average molecular weight) of 500 to 5,000; and also, a crosslinking component and optionally, the composition can contain pigment(s).

The coating composition can be used as a clear coating composition in combination with a pigmented base coat or color coat, which optionally, also may be the novel composition or another composition. The composition can be pigmented and used as a top coating, primer coating, primer surfacer, primer filler coating and the like. The coating composition is particularly useful for coating automobile and truck bodies and parts but can also be used for appliances, industrial equipment, home use items, such as, shelves, cabinets and various furniture items and can be used on a variety of rigid and flexible thermoset and thermoplastic substrates and composite substrates and can be used as an architectural paint for the interior and exterior of homes, office buildings, industrial buildings and the like.

These substrates, over which the coating composition, may be applied may be untreated, treated, primed and the like to improve adhesion. Typical substrates include aluminum, magnesium, copper, tin, zinc, galvanized steel, stainless steel, alloys of steel, cold rolled steel, phosphatized cold rolled steel, phosphatized cold rolled steel having an electrodeposited primer thereon, plastics, such as, polypropylene and copolymers thereof, polyurethanes, polycarbonate, ABS, plastic fiber reinforced substrates, such as RIM, SMC (sheet molding compound) and the like.

One particularly useful coating composition is a primer that is used for refinishing or repairing automobile and truck bodies or parts. This primer has a particular advantage that after a relatively short time after application, it is sufficiently cured and can be sanded. This primer in combination with a topcoat of a color coat and clear coat or a pigmented mono-coat provides a finish that has improved chip resistance.

The term "binder" as used herein refers to the film forming constituents of the composition that include the polymer having reactive groups, polytrimethylene ether diol, and the crosslinking component and any other polymers, reactive oligomers and/or reactive diluents. Solvents, pigments, catalysts, rheology modifiers, antioxidants, UV stabilizers, leveling agents, antifoaming agents, anti-cratering agents, adhesion promoting agents are not included in the term.

The binder of the novel coating composition typically contains (a) 10 to 80% by weight, preferably, 20 to 70% by weight, of the polymer(s) having pendant reactive groups, (b) 1 to 50% by weight, preferably 5 to 40% by weight of polytrimethylene ether diol, and (c) 10 to 50% by weight, preferably 15 to 45% by weight of the crosslinking component. All weight percentages are based on the total weight of the binder of the coating composition and the sum of the percentages of (a), (b) and (c) is 100%

The polymer used in the composition has a weight average molecular weight of about 1,000 to 100,000, a Tg of 10 to 80° C. and contains reactive moieties, such as, hydroxyl, carboxyl, glycidyl, amine, amide, silane or mixtures of such groups. The Tg of the binder when cured is greater than 30° C. Theses polymers can be straight chain polymers, branched polymers, graft copolymers, graft terpolymers and core shell polymers. Typical of these polymers are acrylic polymers, acrylourethane polymers, polyesters, polyesterurethanes, polyetherurethanes, poly(meth)acrylamides, polyepoxides and polycarbonates.

Preferably, acrylic polymers are used having a weight average molecular weight of 5,000 to 50,000 and more preferably, of 10,000 to 25,000 and a Tg preferably, of 30° C. to 80° C. In general, typically useful acrylic polymers are those known in the art and are polymers of the following: linear alkyl(meth)acrylates having 1 to 12 carbon atoms in the alkyl group, cyclic or branched alkyl(meth)acrylates having 3 to 12 carbon atoms in the alkyl group, including isobornyl(meth)acrylate, and the polymer can contain styrene, alpha methyl styrene, vinyl toluene, and (meth)acrylonitrile, (meth)acryl amides and monomers that provide pendant reactive groups like, hydroxy alkyl(meth)acrylates having 1 to 6 carbon atoms in the alkyl group, glycidyl (meth)acrylate, hydroxy amino alkyl(meth)acrylate having 1 to 4 carbon atoms in the alkyl group, alpha beta ethylenically unsaturated carboxylic acids like, (meth)acrylic acid, silane monomers, like alkoxy silyl alkyl(meth)acrylates, such as, trimethoxysilylpropyl(meth)acrylate, silane(meth)acrylate, vinyl trimethoxy silane and the like.

Preferred are hydroxy functional acrylic polymers having a hydroxy equivalent weight (on a solids basis) of 300 to 800, preferably, 380 to 750 and more preferably, 450 to 580 and are polymers of hydroxy alkyl (meth)acrylates and one or more of the aforementioned monomers. The hydroxyl equivalent weight is the grams of resin per equivalent of hydroxyl groups. One preferred hydroxy containing acrylic polymer contains 35 to 40% by weight styrene, 15 to 25% by weight ethylhexyl methacrylate and >15 to 20% by weight isobornyl methacrylate and 20 to 30% by weight hydroxyethyl methacrylate. A particularly preferred acrylic polymer contains 37% styrene, 20% by weight 2-ethylhexyl methacrylate and 17.5% by weight isobornyl methacrylate and 25.5% by weight hydroxyethyl methacrylate Suitable hydroxyl-functional unsaturated monomers that are used to introduce hydroxyl groups into the acrylic polymer are, for example, hydroxyalkyl esters of alpha,beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. The hydroxyalkyl esters of (meth)acrylic acid are preferred. Examples of suitable hydroxyalkyl esters of alpha,beta-olefinically unsaturated monocarboxylic acids with primary hydroxyl groups are hydroxyethyl(meth)acrylate, hydroxypropyl (meth)acrylate, hydroxybutyl(meth)acrylate, hydroxyamyl(meth)acrylate, hydroxyhexyl(meth)acrylate. Examples of suitable hydroxyalkyl esters with secondary hydroxyl groups are 2-hydroxypropyl(meth)acrylate, 2-hydroxybutyl(meth)acrylate, 3-hydroxybutyl(meth)acrylate.

Additional useful hydroxy-functional unsaturated monomers are reaction products of alpha,beta-unsaturated monocarboxylic acids with glycidyl esters of saturated monocarboxylic acids branched in alpha position, for example with glycidyl esters of saturated alpha-alkylalkanemonocarboxylic acids or alpha,alpha'-dialkylalkanemonocarboxylic acids. These preferably comprise the reaction products of (meth) acrylic acid with glycidyl esters of saturated alpha,alpha-dialkylalkanemonocarboxylic acids with 7 to 13 carbon atoms per molecule, particularly preferably with 9 to 11 carbon atoms per molecule. These reaction products may be formed before, during or after the copolymerization reaction.

Further usable hydroxy-functional unsaturated monomers are reaction products of hydroxyalkyl(meth)acrylates with lactones. Hydroxyalkyl(meth)acrylates which may be used are, for example, those stated above. Suitable lactones are, for example, those that have 3 to 15 carbon atoms in the ring, wherein the rings may also comprise different substituents. Preferred lactones are gamma-butyrolactone, delta-valerolactone, epsilon-caprolactone, beta-hydroxy-beta-methyl-delta-valerolactone, lambda-laurolactone or mixtures thereof. Epsilon-caprolactone is particularly preferred. The reaction products preferably comprise those prepared from 1 mole of a hydroxyalkyl ester of an alpha,beta-unsaturated monocarboxylic acid and 1 to 5 moles, preferably on average 2 moles, of a lactone. The hydroxyl groups of the hydroxyalkyl esters may be modified with the lactone before, during or after the copolymerization reaction.

Suitable unsaturated monomers that can be used to provide the acrylic polymer with carboxyl groups are, for example, olefinically unsaturated monocarboxylic acids, such as, for example, acrylic acid, methacrylic acid, crotonic acid, isocrotonic acid, itaconic acid. Acrylic acid and methacrylic acid are preferably used.

Suitable unsaturated monomers that can be used to provide the acrylic polymer with glycidyl groups are, for example, allyl glycidyl ether, 3,4-epoxy-1-vinylcyclohexane, epoxycyclohexyl(meth)acrylate, vinyl glycidyl ether and glycidyl(meth)acrylate. Glycidyl(meth)acrylate is preferably used.

Free-radically polymerizable, olefinically unsaturated monomers which, apart from at least one olefinic double bond, do not contain additional functional groups that can be used to form the acrylic polymer are, for example, esters of unsaturated carboxylic acids with aliphatic monohydric branched or unbranched as well as cyclic alcohols with 1 to 20 carbon atoms. The unsaturated carboxylic acids, which may be considered, are acrylic acid, methacrylic acid, crotonic acid and isocrotonic acid. Esters of (meth)acrylic acid are preferred. Examples of (meth)acrylic acid esters are methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Examples of (meth)acrylic acid esters with cyclic alcohols are cyclohexyl acrylate, trimethylcyclohexyl acrylate, 4-tert.-butylcyclohexyl acrylate, isobornyl acrylate and the corresponding methacrylates.

Further useful unsaturated monomers that do not contain additional functional groups are, for example, vinyl ethers, such as, isobutyl vinyl ether and vinyl esters, such as, vinyl acetate, vinyl propionate, vinyl aromatic hydrocarbons, preferably those with 8 to 9 carbon atoms per molecule. Examples of such monomers are styrene, alpha-methylstyrene, chlorostyrenes, 2,5-dimethylstyrene, p-methoxystyrene, vinyl toluene. Styrene is preferably used.

Small proportions of olefinically polyunsaturated monomers may also be used. These are monomers having at least 2 free-radically polymerizable double bonds per molecule. Examples of these are divinylbenzene, 1,4-butanediol diacrylate, 1,6-hexanediol diacrylate, neopentyl glycol dimethacrylate, glycerol dimethacrylate.

The hydroxy-functional(meth)acrylic polymers generally are formed by free-radical copolymerization using conventional processes well known to those skilled in the art, for example, bulk, solution or bead polymerization, in particular by free-radical solution polymerization using free-radical initiators.

Acrylourethanes also can be used to form the novel coating composition of this invention. Typical useful acrylourethanes are formed by reacting the aforementioned acrylic polymers with an organic polyisocyanate. Generally, an excess of the acrylic polymer is used so that the resulting acrylourethane has terminal acrylic segments having reactive groups as described above. These acrylourethanes can have reactive end groups and/or pendant groups such as hydroxyl, carboxyl, amine, glycidyl, amide, silane or mixtures of such groups. Useful organic polyisocyanates are described hereinafter as the crosslinking component but also can be used to form acrylourethanes useful in this invention. Typically useful acrylourethanes are disclosed in Stamegna et al. U.S. Pat. No. 4,659,780, which is hereby incorporated by reference.

Hydroxy containing polyesters can be used to form the novel coating composition of this invention. Typical polyesters that can be used have an acid value of 15 to 60, a hydroxyl value of not more than 95 and have a number average molecular weight from 1500 to 10,000. The polyesters may be saturated or unsaturated and optionally, may be modified with fatty acids. These polyesters are the esterification product of one or more polyhydric alcohols, such as, alkylene diols and glycols; monocarboxylic acids and a polycarboxylic acids or anhydrides thereof, such as, dicarboxylic and/or tricarboxylic acids or tricarboxylic acid anhydrides.

Examples of polyhydric alcohols used to form the polyester include triols and tetraols, such as, trimethylol propane, triethylol propane, trimethylol ethane, glycerine, and dihydric alcohols and diols that include ethylene glycol, propylene glycol, 1,3-propanediol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexane dimethanol, hydrogenated bisphenols A and F, Esterdiol 204 (Trademark of Union Carbide) and highly functional polyols, such as, trimethylolethane, trimethylolpropane, and pentaerythritol. Polyhydric alcohols having carboxyl groups may be used, such as, dimethylol propionic acid (DMPA).

Typical acids and anhydrides that can be used to form the polyester are aliphatic or aromatic carboxylic acids and anhydrides thereof, such as, adipic acid, azelaic acid, sebacic acid, dimerized fatty acids, maleic acid, maleic anhydride, succinic acid, succinic anhydride, isophthalic acid, terephthalic acid, phthalic acid, phthalic anhydride, dimethyl terephthalic acid, naphthalene dicarboxylic acid, tetrahydro- and hexahydrophthalic anhydride, tetrachlorophthalic acid, terephthalic acid bisglycol ester, benzophenone dicarboxylic acid, trimellitic acid and trimellitic anhydride.

One useful polyester is the estrification product of neopentyl glycol, trimethylol propane, 1,6 hexane diol, adipic acid, isophthalic acid and trimellitic anhydride.

Polyesterurethanes also can be used to form the novel coating composition of this invention. Typically useful polyesterurethanes are formed by reacting the aforementioned polyesters with an organic polyisocyanate. Generally, an excess of the polyester is used so that the resulting polyesterurethane has terminal polyester segments having reactive hydroxyl groups. Carboxy functional polyesterurethanes can also be used. Useful organic polyisocyanates are described hereinafter as the crosslinking component but can be used to form polyesterurethanes useful in this invention. Typically useful coating compositions that utilize polyesterurethanes are disclosed in Johnson U.S. Pat. No. 5,122,522, which is hereby incorporated by reference.

Polycarbonate polyols can be used as to form the novel coating composition and are the esters of carbonic acid which are obtained by the reaction of carbonic acid derivatives, e.g., diphenyl carbonate or phosgene with polyols, preferably diols. Suitable diols are any of those mentioned above.

Polyetherurethanes can be used to form the novel coating composition and are the reaction product of a polyetherpolyol and/or polylactonepolyol and an organic polyisocyanate. Suitable polyetherpolyols are, for example, polyetherpolyols of the following general formula:

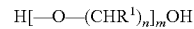

in which $R^1$ represent hydrogen or a lower alkyl group, for example, having 1-6 carbon atoms, and $n=2$ to 6 and $m=10$ to 50. The $R^1$ groups may be identical or different. Examples of polyetherpolyols are poly(oxypropylene) glycols, poly(oxymethylene) glycols, poly(oxyethylene) glycols, or mixtures thereof, block copolymers that contain different glycols or mixed block copolymers that contain different oxytetramethylene, oxyethylene and/or oxypropylene units.

Polylactone polyols that can be used to form a useful polyetherurethane are polyols that are derived from lactones, preferably caprolactones and can be obtained, for example, by reacting epsilon caprolactone with a diol. Diols that can be used to react with lactones are, for example, ethylene glycol, 1,3-propanediol, 1,4-butanediol and dimethylolcyclohexane.

Typically useful polyepoxides that can be used to form the novel coating composition are poly epoxy hydroxy ether resins having 1,2-epoxy equivalency of about two or more, that is, polyepoxides that have on an average basis two or more epoxy groups per molecule. Preferred polyepoxides are polyglycidyl ethers of cyclic polyols. Particularly preferred are polyglycidyl ethers of ployhydric phenols, such as, bisphenol A or bisphenol F. Such polyepoxides can be produced by the etherification of polyhydric phenols with epihalohydrin or dihalohydrin, such as, epichlorohydrin or dichlorohydrin in the presence of alkali. Examples of useful polyhydric phenols are 2,bis-(4-hydroxyphenyl)ethane, 2-methyl-1,1-bis-(4-hydroxyphenyl)propane and the like. Besides polyhydric phenols, other cyclic polyols can be used to prepare the polyglycidyl ethers, such as, alicyclic phenols, particularly, cycloaliphatic polyols, and hydrogenated bisphenol A.

Polyepoxides can be chain extended with polyether or polyester polyols, such as, polycaprolactone diols and with ethoxylated bisphenol A.

Poly(meth)acrylamides can be used to form the novel coating composition, such as, polymers of (meth)acrylamide and alkyl (meth)acrylates, hydroxy alkyl(meth)acrylates, (meth)acrylic acid and or one of the aforementioned ethylenically unsaturated polymerizable monomers.

The polytrimethylene ether diol used in the coating composition has a number average molecular weight (Mn) in the range of 500 to 5,000, preferably 1,000 to 3,000. The polytrimethylene ether diol has a Tg of about −75° C., a polydispersity in the range of 1.1 to 2.1 and a hydroxyl number in the range of 20 to 200.

The polytrimethylene ether diol is prepared by an acid-catalyzed polycondensation of 1,3-propanediol, preferably, as described in US. Published Patent Application Nos. 2002/7043 A1 and 2002/10374 A1, both of which are hereby incorporated by reference. The polytrimethylene ether diol also can be prepared by a ring opening polymerization of a cyclic ether, oxetane, as described in J. Polymer Sci., Polymer Chemistry Ed. 28, 449 to 444 (1985) which is also incorporated by reference. The polycondensation of 1,3-propanediol is preferred over the use of oxetane since it is a less hazardous, very stable, low cost, commercially available material and can be prepared by use of petro chemical feed-stocks or renewable resources.

Preferably, a bio-route via fermentation of a renewable resource is used to obtain the 1,3-propanediol. One particularly preferred renewable resource is corn since it is readily available and has a high rate of conversion to 1,3-propanediol and can be genetically modified to improve yields to diol. Typical bio-conversion processes are shown in U.S. Pat. No. 5,686,276, U.S. Pat. No. 5,633,362 and U.S. Pat. No. 5,821,092. US '276 teaches a bio-conversion process of a fermentable carbon source to 1,3-propanediol by a single microorganism. U.S. Pat. No. '362 and US '092 show the bio-conversion of glycerol to 1,3-propanediol by recombinant bacteria harboring a foreign gene encoding a diol dehydratase. The aforementioned patents are incorporated herein by reference Copolymers of polytrimethylene ether diol also can be used. For example, such copolymers are prepared by copolymerizing 1,3-propanediol with another diol, such as, ethane diol, hexane diol, 2-methyl 1,3-propanediol, 2,2-dimethyl-1,3-propanediol. At least 50% of the copolymer must be from 1,3-propanediol.

A blend of a high and low molecular weight polytrimethylene ether diol can be used wherein the high molecular weight diol has an Mn of 1,000 to 4,000 and the low molecular weight diol has an Mn of 150 to 500. The average Mn of the diol should be in the range of 1,000 to 4,000. Also, the diol can contain polytrimethylene ether triols and other higher functionality polytrimethylene ether polyols in an amount of 1 to 20% based on the weight of the polytrimethylene ether diol.

Blends of the polytrimethylene ether diol and other cycloaliphatic hydroxyl containing either branched or linear oligomers can be used. Such oligomers are disclosed in Barsotti, et al. U.S. Pat. No. 6,221,494, which is hereby incorporated by reference. Up to 30% by weight, based on the weight of the diol, of such oligomers can be used.

Coatings formed from compositions of this invention containing polytrimethylene ether diols in particular have better chip resistance properties in comparison to coating prepared from conventional diols, for example, polytetramethylene ether diols and polyoxypropylene diols.

A variety of crosslinking agents can be used in the novel composition of this invention, such as, organic polyisocyanates, melamine formaldehydes, alkylated melamine formaldehydes, benzoquanamine formaldehyde, urea formaldehyde, polyepoxides, silane resins and any mixtures thereof.

Typically useful organic polyisocyanates crosslinking agents that can be used include aliphatic polyisocyanates, cycloaliphatic polyisocyanates, aromatic polyisocyanates and isocyanate adducts.

Examples of suitable aliphatic, cycloaliphatic and aromatic polyisocyanates that can be used include the following: 2,4-toluene diisocyanate, 2,6-toluene diisocyanate ("TDI"), 4,4-diphenylmethane diisocyanate ("MDI"), 4,4'-dicyclohexyl methane diisocyanate, ("$H_{12}$MDI"), 3,3'-dimethyl-4,4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylene diisocyanate, isophorone diisocyanate, ("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexyl-methane-4,4'-diisocyanate, 3,3'-dimethyl-dicyclohexyl-methane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets, for example, of hexamethylene diisocyanate, allophanates, trimers and biurets, for example, of isophorone diisocyanate and the isocyanurate of hexane diisocyanate. MDI, HDI, TDI and isophorone diisocyanate are preferred because of their commercial availability.

Tri-functional isocyanates also can be used, such as, triphenyl methane triisocyanate, 1,3,5-benzene triisocyanate, 2,4,6-toluene triisocyanate. Trimers of diisocyanates, such as, the trimer of hexamethylene diisocyanate sold as Tolonate® HDT from Rhodia Corporation and the trimer of isophorone diisocyanate are also suitable.

An isocyanate functional adduct can be used, such as, an adduct of an aliphatic polyisocyanate and a polyol or an adduct of an aliphatic polyisocyanate and an amine. Also, any of the aforementioned polyisocyanates can be used with a polyol to form an adduct. Polyols, such as, trimethylol alkanes, particularly, trimethylol propane or ethane can be used to form an adduct.

A particularly useful coating composition useful for the interior of automobiles and truck that forms a finish with a soft leather like touch or feel comprises the polytrimethylene ether diol and an organic polyisocyanate crosslinking agent. Typically, such compositions comprise a binder of about 40 to 90% by weight of the polytrimethylene ether diol and 10 to 60% by weight of an organic polyisocyanate crosslinking agent. O'Neil U.S. Pat. No. 6,207,224 and O'Neil U.S. Pat. No. 6,436,478 disclose such compositions and are hereby incorporated by reference. The polytrimethylene ether glycol can be the polyol component of the coating compositions disclosed in these patents. Such compositions have excellent appearance, good adhesion to thermoplastic substrates, have a soft feel but still have sufficient hardness to avoid scratching and marring and are comparable to commercially available compositions of this type.

Typical alkylated melamines that can be used as the cross linking component are monomeric or polymeric and have a relatively low molecular weight. Alkoxy monomeric melamines that can be used are low molecular weight melamines that contain on an average three or more methylol groups reacted with a monohydric alcohol having 1 to 5 carbon atoms, such as, methanol, propanol, n-butanol and isobutanol and have an average degree of polymerization of less than 2 and preferably, in the range of about 1.1 to 1.8.

Suitable monomeric melamines include highly alkylated melamines, such as, methylated melamines, methylated and butylated melamines, butylated melamines, isobutylated melamines and mixtures thereof. More particularly, hexamethoxymethylol melamine, butylated melamines and mixed methylated and butylated melamines are preferred. Particularly preferred alkylated melamines include hexamethoxymethylol melamines, such as, Cymel® 301 and 303 and Resimene® 747, Cymel® 1156 which is reported to be a 100% butylated melamine having a degree of polymerization of 2.9. A particularly preferred mixture of melamines is Cymel® 1156 and Resimene® CE-4514 which is reported to be a 50/50 methylated/butylated melamine.

A typically useful polymeric melamine is Cymel® 327 which is a highly methylated melamine having a degree of polymerization of 1.8. Other polymeric melamines, such as, Cymel® 328 can also be used.

These melamines are supplied commercially; for example, by Cytec Industries Inc., Stamford, Conn., and by Solutia Inc., Springfield, Mass.

Polyepoxide resins also can be used as the crosslinking component. Any of the aforementioned polyepoxide resins can be used as the crosslinking agent. Generally, if a polyepoxide is used as the crosslinking agent, it is not used as component a. of the novel composition.

Other useful crosslinking components are melamine formaldehyde, benzoguanamine formaldehyde, and urea formaldehyde.

A silane crosslinking component also can be used. One useful silane crosslinking component is an aminofunctional silane crosslinking agent usually in an amount of 0.1 to 50% by weight, based on the weight of the binder; preferably, 0.5 to 10.0% by weight of silane is used.

Typically useful aminofunctional silanes have the formula

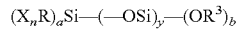

$(X_nR)_aSi-(-OSi)_y-(OR^3)_b$ wherein X is selected from the group of —$NH_2$, —$NHR^4$, and SH, n is an integer from 1-5, R is a hydrocarbon group contain 1 to 22 carbon atoms, $R^3$ is an alkyl group containing 1 to 8 carbon atoms, a is at least 1, y is from 0 to 20, b is at least 2 and $R^4$ is an alkyl group having 1 to 4 carbon atoms.

Typically useful aminofunctional silanes are aminomethyltriethoxysilane, gamma-aminopropyltrimethoxysilane, gamma-aminopropyltriethoxysilane, gamma-aminopropylmethyldiethoxysilane, gamma-aminopropylethydiethoxysilane, gamma-aminopropylphenyldiethoxyysilane, N-beta (aminoethyl)gamma-aminopropyltrimethoxysilane, delta-aminobutyltriethoxysilane, delta-aminobutylethyldiethoxysilane and diethylene triamino propylaminotrimethoxysilane. Preferred are N-beta(aminoethyl)gamma-aminopropyltrimethoxysilane commercially sold as Silquest® A 1120 and diethylene triamino propylaminotrimethoxysilane that is commercially sold as Silquest® A 1130. Both of theses silanes are sold by OSi Specialties, Inc. Danbury, Conn.

When an amino silane crosslinking agent is used, additional amino functional curing agents, such as, primary, secondary and tertiary amines, that are well known in the art are usually added. Typically, aliphatic amines containing a primary amine group, such as, diethylene triamine, and triethylene tetramine can be added. Tertiary amines, such as, tris-(dimethyl aminomethyl)-phenol can also be used.

The novel composition can contain 1 to 50% by weight, preferably, 20 to 40% by weight, based on the weight of the binder of acrylic NAD (non-aqueous dispersed) resins. These NAD resins typically are high molecular weight resins having a crosslinked acrylic core with a Tg between 20 to 100° C. and attached to the core are low Tg stabilizer segments. A description of such NAD resins is in Antonelli et al. U.S. Pat. No. 4,591,533, Antonelli et al. U.S. Pat. No. 5,010,140 and in Barsotti et al. U.S. Pat. No. 5,763,528. These patents are hereby incorporated by reference.

Typically, a catalyst is used in the novel composition to reduce curing time and temperature and allow curing of the coating at ambient temperatures. Typical catalysts include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or mixtures thereof known to those skilled in the art.

The novel composition typically is solvent based and has a solids content of 30 to 90% by weight, preferably, 50 to 80% by weight and more preferably, 60 to 80% by weight, of binder of a ready to spray composition. The novel composition may be formulated at 100% solids by using reactive diluents of low molecular weight resin(s), such as, an acrylic resin.

Any of the known organic solvents may be used to form the coating composition. Typical solvents include aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate and isobutyl acetate. Typical alcohols that can be used are ethanol, propanol, isopropanol, butanol, isobutanol, tertiary butanol, and diacetone alcohol and mixtures of any of the above. Alcohols are not used in the presence of isocyanate crosslinking agents.

An advantage of the novel coating composition of this invention is that it has a low VOC (volatile organic content) and can readily be formulated to have a VOC of less than 334g/l (2.8 pounds per gallon) and in particular can be formulated to a VOC less than 240 g/l (2 pound per gallon) that meets current governmental air pollution regulations.

The composition can contain pigments in a pigment to binder weight ratio of 1/100 to 350/100. When the composition is used as a primer, conventional primer pigments are used in a pigment to binder weight ratio of 50/100 to 350/100. Typical of such pigments that are useful in primers are titanium dioxide, zinc phosphate, iron oxide, carbon black, amorphous silica, high surface area silica, barium sulfate, talc, chromate pigments for corrosion resistance, such as, calcium chromate, strontium chromate, zinc chromate, magnesium chromate, barium chromate and hollow glass spheres. If the coating composition is used as a base coat or topcoat coating composition, metallic flakes and powders, such as, aluminum flake and aluminum powders; special effects pigments, such as, coated mica flakes, coated aluminum flake, colored pigments and inorganic or organic colored pigments may be used usually in combination with one of the aforementioned pigments.

Suitable pigments and extenders that can be used are, for example, inorganic or organic coloring pigments like titanium dioxide, micronised titanium dioxide, iron oxide pigments, carbon black, azo pigments, phthalocyanine pigments, quinacridone or pyrrolopyrrole pigments. Examples of special effect pigments are metal pigments, for example made from aluminium or copper, interference pigments, such as, titanium dioxide coated aluminium, coated mica, graphite special effect pigments and iron oxide in flake form. Examples of extenders are silicon dioxide, barium sulfate, talcum, aluminium silicate and magnesium silicate.

If the novel coating composition is to be used as an exterior coating or as a coating that is subject to weathering and/or exposure to UV light, weatherability and UV durability of the coating can be improved by the addition of an ultraviolet light stabilizer or a combination of ultraviolet light stabilizers in the amount of 0.1% to 10% by weight, based on the weight of the binder. Such stabilizers include ultraviolet light absorbers, screeners, quenchers, and specified hindered amine light stabilizers. An antioxidant also can be added, in the amount of 0.1% to 5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in Antonelli et al. U.S. Pat. No. 4,591,533, the entire disclosure of which is incorporated herein by reference. For good durability, a blend of Tinuvin® 928 and Tinuvin®123 (hindered amine light stabilizers), all commercially available from Ciba Specialty Chemicals, Tarrytown, New York is preferred.

The coating compositions may contain conventional coating additives. The additives comprise the conventional additives usable in the coatings. Examples of such additives are leveling agents based on (meth)acrylic homopolymers, rheological agents, such as highly disperse silica or polymeric urea compounds, thickeners, such as partially cross-linked polycarboxylic acid or polyurethanes, antifoaming agents, wetting agents, catalysts for the cross-linking reaction of the OH-functional binders, for example organic metal salts, such as, dibutyltin dilaurate, zinc naphthenate and compounds containing tertiary amino groups, such as, triethylamine, for the cross-linking reaction with polyisocyanates. The additives are used in conventional amounts familiar to the person skilled in the art.

The novel coating composition may also contain other conventional formulation additives, such as, wetting agents, leveling and flow control agents, for example, Resiflow®S (polybutylacrylate), BYK® 320 and 325 (high molecular weight polyacrylates), BYK® 347 (polyether-modified siloxane) and rheology control agents, such as, fumed silica.

In addition to component a., the coating compositions according to the invention may contain further reactive low molecular weight compounds as reactive diluents that are capable of reacting with the cross-linking component c. For example, low molecular weight polyhydroxyl compounds, such as, ethylene glycol, propylene glycol, trimethylolpropane and 1,6-dihydroxyhexane may be used.

The coating compositions according to the invention may be transparent or pigmented coating compositions. Pigmented coating compositions are produced by mixing the individual constituents with one another and homogenizing or grinding them in conventional manner. It is, for example, possible to proceed by initially mixing a proportion of component a. and/or component b. with the pigments and/or extenders and the additives and solvents conventional in coatings and grinding the mixture in grinding units.

Depending upon the type of cross-linking agent (component c.), the novel composition may be formulated as a single-component or two-component coating compositions. If polyisocyanates with free isocyanate groups are used as the cross-linking agent, the coating compositions are two-component systems, i.e. components a. and b. may be mixed with the polyisocyanate component only shortly before application. If blocked polyisocyanates and/or amino resins are, for example, used as the cross-linking agent, the coating compositions may be formulated as a single component composition. The coating compositions may, in principle, additionally be adjusted to spraying viscosity with organic solvents before being applied.

In a typical two component composition, the two components are mixed together shortly before application. The first component contains the polymer having pendant reactive groups, such as, an acrylic polymer having reactive hydroxyl groups, and the polytrimethylene ether diol and pigments. The pigments can be dispersed in the first component using conventional dispersing techniques, such as, ball milling, sand milling attritor grinding, and the like. The second component contains the crosslinking agent, such as, a polyisocyanate crosslinking agent, and an optional amino functional silane crosslinking agent and an optional additional amine curing agents and solvents.

The coating compositions according to the invention are suitable for vehicle and industrial coating and may be applied by using known processes, in particular spray application. In the context of vehicle coating, the coating compositions may be used both for vehicle original coating and for repair or refinish coating of vehicles and vehicle parts. Curing temperatures depend on the crosslinking agent used. For example, if the crosslinking agent is a polyisocyanate, cure can be accomplished at ambient temperatures but the composition also can be force dried at elevated temperature of 50 to 150° C. Typical baking temperatures used for heat crosslinkable agents, such as, alkylated melamines, are 60 to 160° C., preferably of 100 to 140° C. and are generally used for original vehicle coatings. Curing temperatures of 20° C. to 80° C., in particular of 20 to 60° C., are used for vehicle repair or refinish coating in which the crosslinking agent typically is a polyisocyanate.

The coating compositions according to the invention may be formulated as pigmented or transparent coatings. They may be used for the production of the outer pigmented top coat layer of a multi-layer coating and for the production of the filler and/or primer coat of a multi-layer coating. The present invention also relates to the use of the coating compositions according to the invention as top coat coating compositions and as filler and primer coating compositions and to a process for the production of multi-layer coatings, wherein, in particular, the pigmented top coat and the filler and primer coats of multi-layer coatings are produced by the coating compositions according to the invention.

Heat activated crosslinking agents, such as, alkylated melamine formaldehydes, can be added directly to the coating composition containing the polymer having pendant reactive groups and the polytrimethylene ether diol at any time prior to application since there is no reaction between the crosslinking agent and the other components until after the coating is applied and baked at an elevated temperature.

The coating composition can be applied by conventional techniques, such as, spraying, electrostatic spraying, dipping, brushing, and flow coating. Typically, the coating is applied to a dry film thickness of 50 to 300 microns and preferably, 75 to 200 microns.

Cured clear films (non-pigment containing films) of the novel coating composition formulated with a polymer, for example, an acrylic polymer, have excellent elastic and hardness properties and the Tg of the cured film is greater than 50° C. which is surprising since the diol used in the composition has a Tg of −75° C. While not wishing to be bound by a theory, it is believed the polymer provides the hardness to the coating while the polytrimethylene ether diol segment provides improved flexibility and thus provides a coating with improved chip resistance and desired hardness.

When pigmented and formulated into a primer and cured, the composition of this invention forms finishes having a high excellent flexibility, good adhesion to metal substrates, provides good filling of surface imperfections, can easily be sanded in a short time after application and curing and provides excellent stone chip resistance. In particular, the coating composition has a good cure response at ambient temperatures and excellent cure response at elevated temperature curing conditions.

Testing Procedures used in the Examples

Dry Film Thickness—test method ASTM D4138

Gravelometer—similar to test method ASTM D3170. A 90 degree panel angle is used, with panels and stones conditioned in a freezer held at −26° C. to −36° C. for a minimum of 2 hours prior to testing. One pint of such frozen stones is used in the test. Additionally, 3 pints of room-temperature stones are used on panels stored at room temperature to provide additional information. Panels are rated from 1 to 9 with 1 being the worst (very severe chipping) and 9 being the best (almost no chipping). Optionally, the area (in square millimeters) of the largest chip is also considered in assessing the performance of the coating.

Persoz Hardness Test—the change in film hardness of the coating was measured with respect to time after application by using a Persoz Hardness Tester Model No. 5854 [ASTM D4366] supplied by Byk-Mallinckrodt, Wallingford, Conn. The number of Oscillations [referred as Persoz No.] are recorded.

Hardness—was measured using a Fischerscope® Hardness Tester. [The measurement is in Newtons per square millimeter.]

Tg (glass transition temperature) of a polymer is determined according to ASTM D-3418 (1988).

Molecular weight and hydroxyl number of the polytrimethylene ether diol are determined according to ASTM E222.

Molecular weights Mw and Mn and the polydispersity (Mw/Mn) of the acrylic polymer and other polymers are determined by GPC (Gel Permeation Chromatography) using polystyrene standards and tetrahydrofuran as the solvent.

Percent strain to break and energy to break were obtained on a Model 1122 Instron electromechanical test machine modified for computer control and data reduction and maintained according the standards of ISO 9001. Test sample width was 12.7 mm and thickness was approximately 0.1 mm; the exact thickness was determined with a calibrated micrometer. The gage length was 12.7 mm and test speed was 5.0 mm/min. All results were obtained under ambient laboratory conditions.

The following examples illustrate the invention. All parts and percentages are on a weight basis unless otherwise indicated. Abbreviation "PBW" means parts by weight.

EXAMPLES

Example 1

Preparation of (Polytrimethylene Ether Diols A and B)

1,3-Propanediol (3.4 kg) and concentrated sulfuric acid (30.4 g) were placed in a 5 L three neck round bottom flask fitted with a nitrogen inlet, mechanical stirrer and a distillation head. Nitrogen gas was bubbled through the reaction mixture for 15 minutes. The polymerization was carried out at 160° C. with stirring under a nitrogen atmosphere. After collecting 525 g of water distillate in a receiving flask, the flask was connected to a vacuum pump and the pressure was slowly reduced to 1-5 mm Hg. The molecular weight of the resulting reaction product was monitored by analyzing the samples at different time intervals using an NMR end group analysis method. The polymerization was stopped after obtaining the desired molecular weight (approximately 2,000) and the polymer was purified as described below.

An equal volume of water was added to the crude polymer and the reaction mixture was refluxed at 100° C. for about 6 hours and a stirring speed of 180 rpm was used under a nitrogen atmosphere. After approximately 6 hours, the heater and the stirrer were turned off and the mixture was allowed to separate into two phases. The top aqueous phase was decanted and the polytrimethylene ether diol phase was washed further with distilled water three more times to extract out most of the acid and the oligomers that were formed. The residual acid left in the polytrimethylene ether diol was neutralized with excess lime. The polytrimethylene ether diol was dried at about 100° C. under reduced pressure for 2-3 hours and then the dried diol was filtered while hot through a Whatman filter paper pre-coated with a Celite® filter aid. The polytrimethylene ether diol was analyzed and the properties are listed in Table 1 below. A second polytrimethylene ether diol B was prepared as above and the properties are shown in Table 1.

TABLE 1

Properties of polytrimethylene ether diols A and B

| Polytrimethylene ether diol | A | B |
| --- | --- | --- |
| Number Average Molecular Weight (Mn) | 1850 | 2738 |
| Hydroxyl Number | 60.6 | 41.0 |

Preparation of Primer Millbase Compositions A-C

Primer millbase compositions A, B, and C were prepared by charging the following ingredients into a mixing vessel:

| Primer Millbase Compositions Description of Material | A PBW | B PBW | C PBW |
| --- | --- | --- | --- |
| Portion 1 | | | |
| Butyl acetate | 130.90 | 84.38 | 52.17 |
| Xylene | 21.30 | 21.81 | 22.21 |
| Methyl amyl ketone | 23.20 | 23.81 | 24.25 |

-continued

| Primer Millbase Compositions Description of Material | A PBW | B PBW | C PBW |
|---|---|---|---|
| Methyl isobutyl ketone | 75.30 | 77.09 | 78.50 |
| Polytrimethylene ether diol B Mn 2738 (prepared above) | 75.70 | 38.75 | — |
| Ethylene oxide oligomer[1] | 0.0 | 48.44 | 98.64 |
| Hydroxy acrylic polymer[2] | 295.20 | 305.97 | — |
| Hydroxy acrylic polymer[3] | — | — | 307.9 |
| BYK-320 dispersion (Polysiloxane resin available from Byk Chemie) | 3.80 | 3.88 | 3.95 |
| Anti-Terra U (salt of a long chain polyamine-amide and high molecular weight ester) | 2.80 | 2.82 | 2.87 |
| Dibutyl tin diacetate (10% solution in xylene) | 1.70 | 1.89 | 2.07 |
| Bentone ®-34 (dispersion of Bentone ® 34 from Elementis Specialties) Portion 2 | 76.60 | 78.44 | 79.87 |
| Talc N 503 (talc pigment) | 91.60 | 93.79 | 95.50 |
| Talc D30E (talc pigment) | 134.90 | 138.21 | 140.73 |
| ZEEOS G 200 (hollow glass beads from Eastech Chemical) Portion 3 | 337.40 | 345.57 | 351.88 |
| Blanc Fixe (barium sulfate pigment) | 119.90 | 122.75 | 124.99 |
| Titanium dioxide pigment | 106.10 | 108.70 | 110.69 |
| Carbon black pigment Portion 4 | 2.30 | 2.34 | 2.38 |
| Acetic acid | 1.30 | 1.38 | 1.40 |
| Total | 1500.00 | 1500.00 | 1500.00 |

Ethylene oxide oligomer[1] - reaction product of 1 mole of pentaerythritol, 4 moles of methyl hexahydrophthalic anhydride and 4 moles of ethylene oxide.
Hydroxy acrylic polymer[2] - acrylic polymer of 37 parts styrene, 17.5 parts isobornyl methacrylate, 25.5 parts hydroxyethyl methacrylate, 20 parts 2-ethylhexyl methacrylate having a Mw of 15,000 and a Tg of 68° C.
Hydroxy acrylic polymer[3] - acrylic polymer of 37 parts styrene, 23 parts hydroxyethyl acrylate, 40 parts 2-ethylhexyl methacrylate having a Mw of 15,000 and a Tg of 20° C.

In the preparation of each of the Primer Millbase Compositions A, B and C, Portion 1 was charged into the mixing vessel and stirred for 15 minutes. Portion 2 was premixed and slowly added to the mixing vessel with stirring and stirred for 30 minutes. Portion 3 was premixed and slowly added to the mixing vessel with stirring and stirred for 60 minutes. Portion 4 was added and stirred for 15 minutes and the resulting mixture was ground 3 passes in a top feed sand mill using glass media for 3 passes. Since Primer Millbase Composition C does not contain polytrimethylene ether diol, it is considered to be a comparative composition.

The resulting Primer Millbases A to C have the following properties:

| Primer Millbase | A | B | C |
|---|---|---|---|
| Weight % solids | 70.2 | 72.0 | 73.4 |
| Volume % solids | 49.8 | 51.6 | 53.3 |
| Pigment/Binder ratio | 312.85/100 | 309.71/100 | 309.7/100 |
| Pigment Vol. Concentration (%) | 53.7 | 54.2 | 54.0 |
| Gallon Weight (#/gal) | 12.09 | 12.36 | 12.49 |

Activated Primer Compositions A to C were prepared by blending the following ingredients together shortly before spray application:

| Activated Primer Comp. | A | B | C |
|---|---|---|---|
| Primer Mill Base | 166.40 | 161.95 | 157.69 |
| Reducer[3] | 18.80 | 18.32 | 17.84 |
| Activator[4] | 14.80 | 19.73 | 24.46 |
| Total | 200.00 | 200.00 | 200.00 |

Reducer[3] - 12375S - blend of hydrocarbon solvents commercially available from E. I. DuPont de Nemours and Company, Wilmington, Delaware.
Activator[4] - 12305S - Tolonate ® HDT trimer of hexamethylene diisocyanate (Rhodia Inc.) activator is commercially available from E. I. DuPont de Nemours and Company, Wilmington, Delaware.

The resulting Activated Primer Compositions A to C have the following properties:

| Activated Primer Comp. | A | B | C |
|---|---|---|---|
| NCO:OH ratio | 1.1:1.0 | 1.1:1.0 | 1.1:1.0 |
| Weight % solids | 62.92 | 64.46 | 65.50 |
| Volume % solids | 43.21 | 44.95 | 46.46 |
| Gallon Weight (#/gal) | 11.02 | 11.11 | 11.10 |
| VOC* (calculated #/gal) | 4.09 | 3.94 | 3.82 |

VOC volatile organic content.

The above prepared Activated Primer Compositions A to C were each applied by spraying onto separate cold rolled steel panels coated with about 0.3 to 0.6 mils (7.5 to 15 microns) of a commercial refinish wash primer (described below) and the Activated Primer Composition was cured at ambient temperature. After curing, the resulting dry film thickness of the primer composition was in the range of 4 to 7 mils (100 to 178 microns). The Persoz Hardness and the Fischer Hardness were measured for each of the panels and shown in Tables 2 and 3 below. Primer C panels were retested (Primer C did not contain the polytrimethylene ether diol).

TABLE 2

Persoz Hardness of Activated Primer Compositions A to C

| Primer | 3 Hours | 1 Day |
|---|---|---|
| A | 30 | 66 |
| B | 30 | 51 |
| C | 34 | 36 |
| C (retest) | 34 | 36 |

TABLE 3

Fischer Hardness of Activated Primer Compositions A to C

| Primer | 1 day | 7 days | 18 days | 21 days |
|---|---|---|---|---|
| A | 48 | 84 | 110 | 133 |
| B | 27 | 84 | 110 | 133 |
| C | 21 | 51 | 59 | 60 |
| C (retest) | 23 | 46 | 64 | 64 |

The above data in Tables 2 and 3 shows that Primer Compositions A and B that contained the polytrimethylene ether diol increased in hardness on curing whereas Primer Composition C, which did not contain the polytrimethylene ether diol, did not increase significantly in hardness on curing. Table 2 containing the Persoz Hardness data, shows that the Persoz Hardness approximately doubled from 3 hours to 24 hours after application for Primer Compositions A and B whereas the Persoz Hardness for Primer C only increased slightly. Table 3 containing Fischer Hardness data, shows that the hardness of Primer Compositions A and B is approximately double that of Primer Composition C after 18 and 21 days. Due to the similar hardness values at short times, sandability is expected to be similar for Primer Compositions A to C.

The commercial refinish wash primer utilized to prime the above steel panels is formulated by mixing Variprime® 615S (pigmented component) and Variprime® 616S (reducer component) in a 1/1 volume ratio (weight ratio of 120g of 615S/80 g of 616S) to form a composition having a total solids content of 28.43%, binder solids of 8.39%, pigment to binder weight ratio of 239/100, VOC (#/gal) 5.891 and a gallon weight (#/gal) of 5.42. The binder of the primer is a combination of phenolic/polyvinyl butyral/nitrocellulose resin. The pigment portion of 615S contains zinc chromate pigment in the amount of 5.3% on the total formula composition by weight. The reducer (616S) contains phosphoric acid in the amount of 2.2% by weight based the total formula weight. 615S and 616S are commercial products available from E.I. DuPont de Nemours and Company, Wilmington, Del.

A set of panels primed with Primer Compositions A to C was prepared as above. The panels were allowed to cure overnight at about 24° C. and 50% relative humidity, and were then sanded with 400 grit sandpaper to give a film build of about 4.0 to 4.5 mils (102 to 114 microns). Each of the panels was coated with an un-activated blue metallic base coat—ChromaBase® Blue Metallic basecoat N 8112K (hydroxy functional acrylic polymer dispersion containing dispersed aluminum flake pigments, phthalocyanine blue pigment and carbon black pigment) and Chromasystems Basemaker 7175S (acrylic resin in organic solvents—available from E.I. DuPont de Nemours and Company, Wilmington, Del.). One part of N8112K is mixed with one part 7175S to form an unactivated base coat. Each panel was top coated with a clear top coat (DuPont ChromaClear® V-7500S two component urethane clear coat commercially available from E.I. DuPont de Nemours and Company, Wilmington, Del.).

Another panel was prepared as above with Primer Composition C and the blue metallic base coat was activated with ChromaPremier® 12305S isocyanate activator.

A second set of panels coated with Primer Composition A to C and prepared as described above was coated with an unactivated red base coat—ChromaBase® Red Basecoat B8713K (hydroxyfunctional acrylic polymer dispersion containing Monastral® Magenta pigment dispersion and Perrindo® red dispersion) and Chromasystems Basemaker 7175S (acrylic resin in organic solvents). One part of B8731 K was mixed with one part of 7175 S. Each of the panel was coated with a clear top-coat (described above).

Another panel was prepared as above with Primer Composition C except the base coat was activated with the ChromaPremier® 12305S isocyanate activator.

Each of the above prepared sets of panels was tested for chip resistance using the Gravelometer test as described above. The results are shown in Table 4 below.

TABLE 4

Gravelometer Test Results

| Gravelometer Test | 3 Pints Stones Room Temp. | 1 Pint Stones Frozen |
|---|---|---|
| Blue Metallic Base Coat | | |
| Primer A | 5 | 7 |
| Primer B | 3 | 5 |
| Primer C | 3 | 4 |
| Primer C with Activated Base Coat | 5 | 7 |
| Red Base Coat | | |
| Primer A | 5 | 6 |
| Primer B | 3 | 4 |
| Primer C | 1 | 2 |
| Primer C with Activated Base Coat | 6 | 6 |

The above data shows that for both the panels of the Blue Metallic Base Coat and the Red Base Coat, Primers A and B that contained polytrimethylene ether diol have a higher Gravelometer chip rating at room temperature and at a low temperature in comparison to Primer C that did not contain polytrimethylene ether diol. In both cases, the blue metallic and the red activated base coats in combination with Primer C did not significantly increase the chip resistance in comparison to Primer A that contained the polytrimethylene ether diol. Normally, an activated base coat increases chip resistance. Primer B shows some improvement as compared to Primer C used with an un-activated basecoat. This shows that the addition of polytrimethylene ether diol in combination with an ethylene oxide oligomer improves chip performance in comparison to the use of only ethylene oxide oligomer in Primer C.

Example 2

The following clear coating compositions D, E, and F were prepared by charging the following ingredients into a mixing vessel and thoroughly mixing the ingredients:

| Clear Coating Compositions | D | E | F |
|---|---|---|---|
| Description of Material | PBW | PBW | PBW |
| Hydroxy acrylic polymer[3] | — | — | 90.0 |
| Hydroxy acrylic polymer[2] | 90 | 90 | — |
| Polytrimethylene ether diol Mn 1810 | 23 | — | — |
| Ethylene oxide oligomer[1] | — | 28.8 | 29.2 |
| Dibutyl tin dilaurate (10% solution in xylene) | 0.21 | 0.24 | 0.24 |
| Butyl acetate | 30.5 | 34.8 | 35.7 |
| Xylene | 23.5 | 24.0 | 24.7 |
| Methyl amyl ketone | 30.5 | 34.8 | 35.7 |
| Byk-333 from Byk-Chemie | 0.06 | 0.07 | 0.07 |
| Activator[4] | 34.9 | 53.9 | 54.9 |
| Total | 232.67 | 266.61 | 270.5 |

Hydroxy acrylic polymer[2] - described in Example 1.
Hydroxy acrylic polymer[3] - described in Example 1.
Ethylene oxide oligomer[1] - described in Example 1.
Activator[4] - described in Example 1.

The above prepared Clear Coating Compositions D to F were each applied with a draw-down bar over electrocoated steel panels to give a dry film thickness of 2 mils (51 microns) and the resulting clear coating compositions were cured at an ambient temperature of about 24° C. The Persoz Hardness and the Fischer Hardness were measured for each of the panels at different times and the data is shown in Tables 5 and 6 below. The Tg, % Strain to Break, and Energy to Break were measured for each of the clear coating compositions after curing for 30 days at about 24° C. and 50% relative humidity and the results are shown in Table 7 below.

TABLE 5

Persoz Hardness of Clear Coating Compositions D to F

| Clear Coating | 3 Hours | 1 Day |
|---|---|---|
| D | 10 | 78 |
| E | 17 | 175 |
| F | 4 | 60 |

TABLE 6

Fischer Hardness Clear Coating Compositions D to F

| Clear Coating | 1 day | 7 days | 14 days | 21 days |
|---|---|---|---|---|
| D | 24.5 | 102 | 104 | 109 |
| E | 55 | 145 | 151 | 156 |
| F | 8.6 | 124 | 135 | 136 |

TABLE 7

Tg, % Strain at Break and Energy to Break Clear Coatings D to F

| Clear Coating | Tg | % Strain to Break | Energy to Break (mi/sq.mm) |
|---|---|---|---|
| D | 60.3 | 52.6 | 112.4 |
| E | 63.7 | 7.0 | 32.8 |
| F | 58.0 | 6.6 | 31.2 |

Clear Coating Composition F is a comparative composition that was formulated with a low Tg acrylic polymer (Tg 20° C.). Clear Coating Composition E is a comparative composition that was formulated with a high Tg acrylic polymer (Tg 68° C.). Clear Coating Composition D is a preferred composition of the invention and was also formulated with the same high Tg acrylic polymer. Clear Coating Composition D has acceptable hardness values (Persoz and Fischer) but significantly higher % Strain to Break and Energy to Break which typically translates into a more durable clear coating composition that is useful on automobiles and truck in comparison to Clear Coating Compositions E and F. Clear Coating Composition E that used the same high Tg acrylic polymer as Clear Coating Composition D but did not use the polytrimethylene ether diol but rather a ethylene oxide oligomer had high hardness but significantly lower % Strain to Break and Energy to Break in comparison to Clear Coating Composition D which represents the invention. Similarly, Clear Coating Composition F that used the low Tg acrylic polymer and the ethylene oxide oligomer had significantly lower % Strain to Break and Energy to Break in comparison to Clear Coating Composition D which represents the invention.

Example 3

The following clear coating compositions G through K were prepared by charging the following ingredients into a mixing vessel and thoroughly mixing the ingredients:

| Clear Coating Compositions | G | H | I | J | K |
|---|---|---|---|---|---|
| Description of Material | PBW | PBW | PBW | PBW | PBW |
| Hydroxy acrylic polymer[2] | 58.7 | 58.6 | 58.0 | 50.5 | 68.7 |
| Polytrimethylene ether diol Mn 2753 | 15.1 | — | — | — | — |
| PPG 2000[5] | — | 15.0 | — | — | — |
| Terathane ® 2000[6] | — | — | 14.9 | — | — |
| S Diol[7] | — | — | — | 12.9 | 2.2 |
| Dibutyl tin diacetate (10% solution in xylene) | 0.3 | 0.3 | 0.3 | .03 | .03 |
| Activator[4] | 25.9 | 26.1 | 26.9 | 36.3 | 28.8 |
| Total | 100.0 | 100.0 | 100.0 | 100.0 | 100.0 |

Hydroxy acrylic polymer[2] - described in Example 1.
PPG 2000[5] - Polypropylene glycol having a molecular weight of 2000 from Aldrich Chemical Company (product no. 81380).
Terathane ® 2000[6] polyether glycol having a molecular weight of 2023 from E. I. DuPont de Nemours and Company.
S Diol[7] - hydroxy oligomer (reaction product of 3 moles of caprolactone and 1 mole of 1,4-cyclohexane dimethanol).
Activator[4] - described in Example 1.

The above prepared Clear Coating Compositions G to K were each applied with a draw-down bar on electrocoated steel panels. The clear coating compositions were cured at an ambient temperature of about 24° C. The resulting dry film thickness of each of the clear coating compositions was in the range of 1.8 to 2.2 mils (46 to 56 microns).

The Gel Fraction and Tg of each of the clear films after 30 days curing at about 24° C. and 50% relative humidity were measured and the results shown in Table 8 following.

TABLE 8

Gel Fraction and Tg (Glass Transition Temperature) Clear Coating Films G to K

| Clear Coating | Gel Fraction | Tg |
|---|---|---|
| G | 97.80% | 64.2 |
| H | 89.90% | 61.4 |
| I | 98.10% | 58.5 |
| J | 93.40% | 33.1 |
| K | 93.00% | 59.8 |

The Glass Transition Temperatures (Tg) of the Clear Coating Films G-I and K were very similar. Clear Coating J had a relatively low Tg in comparison to the other Clear Coatings. The relatively large amount of soluble material in Clear Coating Film H indicates that this film should have poorer long term outdoor durability in comparison Clear Coatings G and I. Clear Coatings J and K have more soluble material than Clear Coatings G and I and are also expected, not to have as good long term outdoor durability as Clear Coatings G and I.

Example 4

Preparation of Primer Millbase Compositions L to P

Primer millbase compositions L to P were prepared by charging the following ingredients into a mixing vessel:

| Primer Millbase Compositions | L | M | N | O | P |
|---|---|---|---|---|---|
| Description of Material | PBW | PBW | PBW | PBW | PBW |
| Portion 1 | | | | | |
| Butyl acetate | 131.0 | 131.0 | 131.0 | 130.9 | 127.3 |
| Xylene | 21.3 | 21.3 | 21.3 | 21.3 | 20.7 |
| Methyl amyl ketone | 23.3 | 23.3 | 23.3 | 23.2 | 22.5 |
| Methyl isobutyl ketone | 75.3 | 75.3 | 75.3 | 75.2 | 73.2 |
| Polytrimethylene ether diol Mn 2753 | 75.7 | — | — | — | — |
| PPG 2000[5] described in Example 3 | — | 75.7 | — | — | — |
| Terathane ® 2000[6] described in Example 3 | — | — | 75.7 | — | — |
| S Diol[7] described in Ex. 3 | — | — | — | 75.7 | 12.3 |
| Hydroxy acrylic polymer[2] described in Ex. 1 | 295.3 | 295.3 | 295.3 | 295.2 | 389.6 |
| BYK-320 dispersion (Polysiloxane resin available from Byk Chemie) | 3.8 | 3.8 | 3.8 | 3.7 | 3.7 |
| Anti-Terra U (salt of a long chain polyamine-amide and high molecular weight ester) | 2.8 | 2.8 | 2.8 | 2.8 | 2.7 |
| Dibutyl tin diacetate (10% solution in xylene) | 1.7 | 1.7 | 1.7 | 1.9 | 1.7 |
| Bentone ®-34 (dispersion of Bentone ®-34 from Elementis Specialties) | 76.6 | 76.6 | 76.6 | 76.6 | 74.5 |
| Portion 2 | | | | | |
| Talc N 503 (talc pigment) | 91.6 | 91.6 | 91.6 | 91.6 | 89.0 |
| Talc D30E (talc pigment) | 134.9 | 134.9 | 134.9 | 134.9 | 131.3 |
| ZEEOS G 200 (hollow glass beads from Eastech Chemical) | 337.4 | 337.4 | 337.4 | 337.4 | 328.1 |
| Portion 3 | | | | | |
| Blanc Fixe (barium sulfate pigment) | 119.9 | 119.9 | 119.9 | 119.8 | 116.6 |
| Titanium dioxide pigment | 106.1 | 106.1 | 106.1 | 106.1 | 103.2 |
| Carbon black pigment | 2.3 | 2.3 | 2.3 | 2.2 | 2.3 |
| Portion 4 | | | | | |
| Acetic acid | 1.4 | 1.4 | 1.4 | 1.3 | 1.3 |
| Total | 1500 | 1500 | 1500 | 1500 | 1500 |

In the preparation of each of the Primer Millbase Compositions L to P, Portion 1 was charged into the mixing vessel and stirred for 15 minutes. Portion 2 was premixed and slowly added to the mixing vessel with stirring and stirred for 30 minutes. Portion 3 was premixed and slowly added to the mixing vessel with stirring and stirred for 60 minutes. Portion 4 was added and stirred for 15 minutes and the resulting mixture was ground 3 passes in a top feed sand mill using glass media for 3 passes. Since Primer Millbase Compositions M to P do not contain polytrimethylene ether diol, they are considered to be comparative compositions.

The resulting Primer Millbases L to P have the following properties:

| Primer Millbase | L | M | N | O | P |
|---|---|---|---|---|---|
| Weight % solids | 69.9 | 69.9 | 69.9 | 69.9 | 67.8 |
| Volume % solids | 49.1 | 49.1 | 52.7 | 48.9 | 46.3 |
| Pigment/Binder ratio | 318.5/100 | 318.5/100 | 318.5/100 | 318.5/100 | 321.7/100 |
| Pigment Vol. Concentration (%) | 54.61 | 54.47 | 47.2 | 55.01 | 55.58 |
| Gallon Weight (#/gal) | 12.13 | 12.13 | 11.26 | 12.17 | 11.98 |

Activated Primer Compositions L to P were prepared by blending the following ingredients together shortly before spray application:

| Activated Primer Comp. | L | M | N | O | P |
|---|---|---|---|---|---|
| Primer Mill Base | 250 | 249.8 | 249.1 | 159.4 | 163.3 |
| Reducer[3] | 28.3 | 28.3 | 28.2 | 18.0 | 18.5 |
| Activator[4] | 21.7 | 21.9 | 22.7 | 22.5 | 17.9 |
| Total | 300.0 | 300.0 | 300.0 | 199.9 | 199.7 |

Reducer[3] - described in Example 1.
Activator[4] - described in Example 1

The resulting Activated Primer Compositions L to P have the following properties:

| Activated Primer Composition | L | M | N | O | P |
|---|---|---|---|---|---|
| NCO:OH ratio | 1.12:1.0 | 1.12:1.0 | 1.12:1.0 | 1.12:1.0 | 1.12:1.0 |
| Weight % solids | 62.6 | 62.6 | 62.6 | 62.7 | 61.0 |
| Volume % solids | 42.6 | 42.7 | 41.7 | 43.3 | 41.0 |
| Gallon Weight (#/gal) | 11.0 | 11.1 | 10.4 | 10.9 | 10.9 |
| VOC* (calculated #/gal) | 4.1 | 4.09 | 3.9 | 4.06 | 4.04 |

VOC volatile organic content.

The above prepared Activated Primer Compositions L to P were each applied by spraying onto separate cold rolled steel panels coated with about 0.3 to 0.6 mils (7.5 to 15 microns) of a commercial refinish wash primer (described in Example 1) and the Activated Primer Composition was cured at ambient temperature. The resulting dry film thickness of the primer composition was in the range of 4 to 7 mils (100 to 178 microns). The Persoz Hardness and the Fischer Hardness were measured for each of the panels and shown in Tables 9 and 10 below.

TABLE 9

Persoz Hardness of Activated Primer Compositions L to P

| Primer | 3 Hours | 1 Day |
|---|---|---|
| L | 34 | 86 |
| M | 39 | 93 |
| N | 41 | 85 |
| O | 35 | 46 |
| P | 30 | 61 |

TABLE 10

Fischer Hardness of Activated Primer Compositions L to P

| Primer | 1 day | 7 days |
|---|---|---|
| L | 74 | 105 |
| M | 100 | 117 |
| N | 68 | 123 |
| O | 30.4 | 61 |
| P | 47 | 157 |

The above data in Table 9 shows that Primer Compositions L to P have about the same Persoz Hardness after 3 hours but after one day Primers L to N have a significant higher level of hardness in comparison to Primers O and P that contained S Diol and did not contain the polytrimethylene ether diol. The above data in Table 10 shows that Primer Compositions L to N have relatively high hardness values after 1 day in comparison to Primer Compositions O and P that contained S Diol and did not contain the polytrimethylene ether diol. After 7 days, Primer Composition O that contained S Diol had significantly lower hardness value comparison to the Primer Compositions L, M, N. and P.

A set of panels primed with Primer Compositions L to P was prepared as above. The panels were allowed to cure overnight at about 24° C. and 50% relative humidity and were then sanded with 400 grit sandpaper and the resulting film build was about 4.0 to 4.5 mils (102 to 114 microns). Each of the panels was coated with an un-activated red metallic base coat (described in Example 1). Each panel was top coated with a clear top coat (DuPont ChromaClear® V-7500S described in Example 1) and cured.

Each of the above prepared panels was tested for chip resistance using the Gravelometer test as described above. The results are shown in Table 11 below.

TABLE 11

Gravelometer Test Results

| Gravelometer Test | 3 Pints Stones Room Temp. | 1 Pint Stones Frozen | Size of Largest Chip |
|---|---|---|---|
| Red Metallic Base Coat | | | |
| Primer L | 5 | 6 | 7.5 sq. mm |
| Primer M | 5 | 6 | 10 sq. mm |
| Primer N | 5 | 6 | 15 sq. mm |
| Primer O | 2 | 2 | Not rated |
| Primer P | 2 | 2 | Not rated |

Primer L, the invention, Primer M and Primer N have similar Gravelometer Chip ratings whereas Primers O and P have very low and unacceptable Gravelometer Chip ratings. The size of the largest chip is also a consideration. Primer L, the invention, has the smallest size chips and is considered to have the best performance in comparison to Primers M and N that had noticeably larger chip sizes. Primers 0 and P were not rated for chip size since the Gravelometer Chip ratings were poor.

The invention claimed is:

1. A coating composition comprising a film forming binder comprising
    a. at least one polymer having pendant groups selected from the group consisting of hydroxyl, carboxyl, glycidyl, amine, amide, silane and mixtures thereof and having a glass transition temperature (Tg) of 10 to 80° C. and wherein the pendant groups are reactive with crosslinking component c.;
    b. a polytrimethylene ether diol having a Mn (number average molecular weight) of 500 to 5,000; and
    c. a crosslinking component selected from the group consisting of organic polyisocyanates, melamine formaldehydes, alkylated melamine formaldehydes, benzoquanamine formaldehyde, urea formaldehyde, polyepoxides, silane resins and any mixtures thereof.

2. The coating composition of claim 1 wherein the polytrimethylene ether diol has a Mn 1,000 to 3,000, a Tg of approximately −75° C. and a hydroxyl number of 20 to 200.

3. The coating composition of claim 1 wherein the binder comprises
    a. 10 to 80% by weight of at least on polymer having pendant reactive groups,
    b. 1 to 50% by weight of polytrimethylene ether diol,
    c. 10 to 50% by weight of the crosslinking agent;
wherein the percentages are based on the weight of the binder and the sum of the percentages of a, b. and c. is 100%.

4. The coating composition of claim 3 wherein the polymer having reactive groups is an acrylic polymer wherein the reactive groups are selected from the group consisting of hydroxyl groups, carboxyl groups, glycidyl groups, amino groups, silane groups and any mixtures thereof.

5. The coating composition of claim 4 wherein the acrylic polymer has a weight average molecular weight of 5,000-50,000 and a Tg of 10° C. to 80° C. and consists essentially of polymerized monomers selected from the group consisting of linear alkyl (meth)acrylates having 1-12 carbon atoms in the alkyl group, cyclic or branched alkyl (meth)acrylates having 3-12 carbon atoms in the alkyl group, isobornyl (meth)acrylate, styrene, alpha methyl styrene, (meth)acrylonitrile, (meth)acryl amides, and polymerized monomers that provide groups reactive with isocyanate selected from the group consisting of hydroxy alkyl(meth)acrylates having 1 to 4 carbon atoms in the alkyl group, glycidyl (meth)acrylates, hydroxy amino alkyl(meth)acrylates having 1 to 4 carbon atoms in the alkyl group, alkoxy silyl alkyl(meth)acrylates and (meth)acrylic acid.

6. The coating composition of claim 5 wherein the acrylic polymer has a hydroxyl equivalent weight of 300 to 800 and consists essentially of polymerized monomers selected from the group consisting of alkyl(meth)acrylates having 1 to 12 carbon atoms in the alkyl group, isobornyl methacrylate styrene, alpha methyl styrene, (meth)acrylonitrile, (meth) acryl amides and mixtures thereof, and polymerized monomers consisting essentially of hydroxy alkyl(meth)acrylates having 1 to 4 carbon atoms in the alkyl group.

7. The coating composition of claim 6 wherein the acrylic polymer consists essentially of styrene, ethylhexyl methacrylate, isobornyl methacrylate and hydroxyethyl(meth) acrylate.

8. The coating composition of claim 3 wherein the crosslinking agent is an organic polyisocyanate selected from the group consisting of aliphatic polyisocyanates, cycloaliphatic polyisocyanates, aromatic polyisocyanates, trifunctional isocyanates and isocyanate adducts.

9. The coating composition of claim 3 in which the polyisocyanate is selected from the group consisting of isophorone diisocyanate, toluene diisocyanate, hexamethylene diisocyanate, diphenylmethane diisocyanate, triphenyl triisocyanate, benzene triisocyanate, toluene triisocyanate and the trimer of hexamethylene diisocyanate.

10. The coating composition of claim 1 in which the polymer having pendant groups is a polyester having pendant groups selected from the group consisting of hydroxyl groups, carboxyl groups and mixtures thereof.

11. The coating composition of claim 1 in which the polymer having pendant groups is a polyesterurethane having pendant groups selected from the group consisting of hydroxyl groups, carboxyl groups and mixtures thereof.

12. The coating composition of claim 1 in which the polymer having pendant groups is a polyepoxy resin having pendant hydroxyl groups and epoxide groups.

13. The coating composition of claim 1 in which the polymer having pendant groups is polyetherurethane having pendant groups selected from the group consisting of hydroxyl groups, carboxyl groups and mixtures thereof.

14. The coating composition of claim 1 in which the polymer having pendant groups is a poly(meth)acrylamide.

15. The coating composition of claim 1 in which the polymer having pendant groups is a polyacryloyurethane having pendant groups selected from the group consisting of hydroxyl groups, carboxyl groups and mixtures thereof.

16. The coating composition of claim 1 in which the polymer having pendant groups is a polycarbonate.

17. The coating composition of claim 3 containing an aminofunctional silane crosslinking agent having the formula

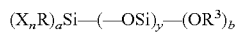

wherein X is selected from the group consisting of —NH$_2$, —NHR$^4$, and SH, n is an integer from 1 to 5, R is a hydrocarbon group contain 1 to 22 carbon atoms, R$^3$ is an alkyl group containing 1 to 8 carbon atoms, a is at least 1, y is from 0 to 20, b is at least 2 and R$^4$ is an alkyl group having 1 to 4 carbon atoms.

18. The coating composition of claim 17 containing an at least one additional amino functional compound selected from the group consisting of primary amines, secondary amines and tertiary amines.

19. The coating composition of claim 17 wherein the aminofunctional silane is selected from the group consisting of N-beta-(aminoethyl)gamma-aminopropyl trimethoxy silane and diethylene triamino propylaminotrimethoxy silane.

20. The coating composition of claim 3 in which the crosslinking agent comprises melamine formaldehyde.

21. The coating composition of claim 3 in which the crosslinking agent comprise an alkylated melamine formaldehyde.

22. The coating composition of claim 3 in which the crosslinking agent comprise a benzoquanamine formaldehyde.

23. The coating composition of claim 3 in which the crosslinking agent comprise an urea formaldehyde.

24. The coating composition of claim 3 in which the crosslinking agent comprises a polyepoxide.

25. The coating composition of claim 3 in which the crosslinking agent comprises a silane resin.

26. The coating composition of claim 1 containing pigments in a pigment to binder weight ratio of 1/100 to 350/100.

27. The coating composition of claim 1 comprising in addition to the polytrimethylene ether diol, a branched or linear oligomer.

28. The coating composition of claim 1 wherein the polytrimethylene ether diol is formed via a bio conversion process.

29. A two component coating composition comprising
Component A of a polymer having pendant groups that are reactive with isocyanate moieties and having a glass transition temperature (Tg) of 10 to 80° C., and a polytrimethylene ether diol having a Mn (number average molecular weight) of 500 to 5,000; and
Component B an organic polyisocyanate crosslinking agent;
wherein Components A and B are thoroughly mixed together before application to a substrate.

30. A coating composition comprising a film forming binder of
a. at least one polymer having pendant groups selected from the group consisting of hydroxyl, carboxyl, glycidyl, amine, amide, silane and mixtures thereof and having a glass transition temperature (Tg) of 10 to 80° C. and wherein the pendant groups are reactive with the crosslinking agent c.;
b. a copolymer of polytrimethylene ether diol having a Mn (number average molecular weight) of 500 to 5,000 comprising at least 50% by weight, based on the weight of the diol of polymerized 1,3-propanediol and up to 50% by weight, based on the weight of the diol of another polymerized alkane diol; and
c. a crosslinking component selected from the group consisting of organic polyisocyanates, melamine formaldehydes, alkylated melamine formaldehydes, benzoquanamine formaldehyde, urea formaldehyde, polyepoxides, silane resins and any mixtures thereof.

31. The coating composition of claim 30 containing up to 60% by weight of solvent.

32. The coating composition of claim 30 wherein the copolymer of polytrimethylene ether diol has a Mn 1,000 to 3,000, a Tg of approximately −75° C. and a hydroxyl number of 20 to 200.

33. The coating composition of claim 30 wherein the copolymer of polytrimethylene ether diol is a blend of high and low molecular weight ether diols wherein the high molecular weight diol has an Mn of 1,000 to 4,000 and the low molecular weight diol has an Mn of 150 to 500 and the average Mn of the blend is 1,000 to 3,000.

34. The coating composition of claim 30 wherein the polymer having pendant groups has a weight average molecular weight of 5,000 to 50,000 and a Tg of 30° C. to 80° C. and consists of an acrylic polymer consisting essentially of polymerized monomers selected from the group consisting of linear alkyl(meth)acrylates having 1 to 12 carbon atoms in the allyl group, cyclic or branched alkyl (meth)acrylates having 3 to 12 carbon atoms in the alkyl group, isobornyl(meth)acrylate, styrene, alpha methyl styrene, (meth)acrylonitrile, (meth)acryl amides, and polymerized monomers that provide groups reactive with isocyanate selected from the group consisting of hydroxy alkyl(meth) acrylates having 1 to 4 carbon atoms in the alkyl group, glycidyl(meth)acrylates, hydroxy amino alkyl(meth)acrylates having 1 to 4 carbon atoms in the alkyl group, alkoxy silyl alkyl(meth)acrylate and (meth)acrylic acid.

35. The coating composition of claim 34 wherein the acrylic polymer has a hydroxyl equivalent weight of 300 to 800 and consists essentially of polymerized monomers selected from the group consisting of alkyl(meth)acrylates having 1 to 12 carbon atoms in the alkyl group, isobornyl methacrylate styrene, alpha methyl styrene, (meth)acrylonitrile, (meth)acryl amides, and polymerized monomers consisting of hydroxy alkyl(meth)acrylates having 1 to 4 carbon atoms in the alkyl group.

36. The coating composition of claim 35 wherein the acrylic polymer consists essentially of styrene, ethylhexyl methacrylate, isobornyl methacrylate and hydroxyethyl (meth)acrylate.

37. The coating composition of claim 30 wherein the crosslinking component comprises a polyisocyanate selected from the group consisting of aliphatic polyisocyanates, cycloaliphatic polyisocyanates, aromatic polyisocyanates, trifunctional isocyanates and isocyanate adducts.

38. The coating composition of claim 30 containing pigments in a pigment to binder weight ratio of 1/100 to 300/100.

39. A coating composition comprising a binder comprising about 40 to 90% by weight, based on the weight of the binder, of polytrimethylene ether diol having a Mn (number average molecular weight) of 500 to 5,000 and 10 to 60% by weight, based on the weight of the binder, of an organic polyisocyanate crosslinking agent.

40. A coated substrate which comprises a substrate coated with a layer of the coating composition of claim 1.

41. The coated substrate of claim 40 wherein the substrate is selected from the group consisting of steel and aluminum.

42. The coated substrate of claim 40 comprising a top coating selected from the group consisting of a clear coat/pigmented base coat and a pigmented topcoat.

43. A process which comprises applying a first layer of the composition of claim 1 to a substrate and drying said layer and applying at least on additional layer of a coating composition to the first layer and curing the layers.

44. The process of claim 43 wherein the at least one additional layer comprises a pigmented color coat and a clear coat.

45. A process which comprises applying a first layer of the composition of claim 30 to a substrate and drying said layer and applying at least on additional layer of a coating composition to the first layer and curing the layers.

46. The process of claim 45 wherein the at least one additional layer comprises a pigmented color coat and a clear coat.

47. A process for refinishing a damaged coating on a motor vehicle body which comprises applying a layer of the pigmented coating composition of claim 2 to damaged coating and at least partially curing the layer and then applying a second layer of a pigmented top coat or a layer of a pigmented base coat and a layer of a clear coat and curing all of the layers to form a finish.

* * * * *